Sept. 9, 1969     E. R. CUNNINGHAM     3,466,096

SELECTIVE BRAKING SYSTEM FOR FOUR WHEEL DRIVE VEHICLES

Filed Oct. 3, 1968

INVENTOR.
Ernest R. Cunningham
BY Barry L. Clark
Robert W. Beart
His Att'ys

United States Patent Office 3,466,096
Patented Sept. 9, 1969

3,466,096
SELECTIVE BRAKING SYSTEM FOR FOUR WHEEL DRIVE VEHICLES
Ernest R. Cunningham, Libertyville, Ill., assignor to Illinois Tool Works Inc., Chicago, Ill., a corporation of Delaware
Filed Oct. 3, 1968, Ser. No. 764,801
Int. Cl. B60t 13/10
U.S. Cl. 303—6                                           5 Claims

ABSTRACT OF THE DISCLOSURE

System for preventing wheel slip by selectively braking any single wheel, any pair of wheels which are not on the same axle, or all four wheels on a four wheel drive vehicle. The brakes on the individual wheels are manually controlled by the vehicle operator by means of one or more foot or hand actuated control members. By proper actuation of the control members, further slipping of any drive wheel(s) caused by differences in the traction between the slipping wheel(s) and the surface contacted thereby and another wheel connected to the slipping wheel(s) through a differential is prevented.

BACKGROUND OF THE INVENTION

Field of the invention

This invention relates to motor vehicle braking systems and more particularly to control means for actuating individual wheel brakes for controlling the slippage of the wheels on poor traction surfaces and permitting the transfer of maximum tractive effort to a wheel connected to a slipping wheel by means of a differential.

Description of the prior art

Vehicles intended for use in the construction field, such as front end loaders, conventionally drive each of the four wheels and utilize a differential unit between each pair of drive wheels in order to permit the drive wheels to rotate at different speeds during turns when the distance traveled by one wheel is greater than that of the other. Although a differential is a necessity where the driven wheels of a vehicle must be turned at different speeds, it presents problems in transferring power to the wheels to achieve maximum traction. For example, in a conventional bevel gear differential wherein the gearing is quite efficient, one wheel can turn relative to another in a turn with little or no frictional dragging effect on the wheel's tire by the traction surface. However, this same high efficiency which prevents tire wear in turning will act to prevent a wheel on a firm surface from turning and providing traction when the wheel attached to it by the differential is engaged with a low friction surface such as mud. Although many spin limiting differential devices have been designed to increase the tractive effort of a vehicle by reducing the efficiency of the gearing system, such devices commonly impose a certain amount of wear on the tires during turns by opposing the tendency of the wheels to differentiate. They also absorb power because of their inefficiency.

It has long been realized that braking of a slipping wheel in a vehicle having an efficient differential will permit more torque to be transferred to the wheel having better traction than if the slipping wheel is permitted to continue to slip. Farm tractors have used this principle for years by having individual brakes for the two driving wheels. For example, in a vehicle having a differential with a 90% efficiency, the wheel with better traction gets approximately 1.1 times the torque of the wheel with poorer traction. Obviously then, if a slipping wheel has little or no traction, the other can have little more since it receives only about 10% more torque than the slipping one. However, if the slipping wheel is braked, and up to 50% of the available power is absorbed in the braking, a minimum of 50% of the available power will still reach the wheel having better traction. Thus, even with the power losses of braking, a substantial gain in tractive effort for the non-slipping wheel is made.

As previously noted, farm tractors have incorporated individual brakes to provide separate braking. However, known manual hand or foot operated controls for braking systems require either separate actuation of each brake or actuation of all brakes at once. There have also been automatic braking systems proposed such as those found in U.S. Patents 3,025,722 and 3,169,595. In these latter systems, electrical devices sense differences in wheel speeds to apply the brakes. Such systems are, however, quite complicated and expensive.

SUMMARY OF THE INVENTION

It is a primary object of this invention to provide a braking system for a four wheel drive vehicle in which a hand or foot operated control means can control the brakes on any individual wheel, any pair of wheels not on the same axle, or all four wheels at once.

It is another object of this invention to provide a braking system wherein a single hand or foot operated control member can control the brakes on any individual wheel, any pair of wheels not on the same axle, or all four wheels at once.

It is a further object of this invention to provide a brake control operating member, and particularly a brake pedal, which is pivotable in a backwards or forwards, a sidewards, a diagonal, or an up and down direction to control the brakes on any individual wheel, any pair of wheels not on the same axle, or all four wheels at once.

These objects are obtained by the wheel slip control system of the present invention. The control system is adapted to be applied to a four-wheel drive vehicle having differentials on each of the front and rear axles and a wheel cylinder associated with each wheel for actuating the brake members on such wheel. The control system includes a brake pedal which can be depressed in nine different modes. The brake pedal is mounted about a central ball or universal joint and is capable of being rocked or pivoted so as to actuate either one, two or four brake fluid control valves attached by linkages to its four corners. The fluid control valve devices each comprise a piston and cylinder of the master cylinder variety found in conventional automotive vehicles. The pistons in each of these cylinders is spring biased upwardly toward the brake pedal to a normally inoperative position. Such mounting of the brake pedal and control valves or cylinders makes it possible for any individual wheel to be braked by merely depressing one of the four corners of the brake pedal. By depressing the brake pedal downwardly on either side the brakes for the wheels on that side of the vehicle can be selectively operated. By pressing downwardly on the forward or the rearward portion of the pedal the brakes for diagonal sets of wheels will be actuated. Finally, by depressing the pedal straight down it is possible to actuate all four brakes at once.

DESCRIPTION OF THE PREFERRED EMBODIMENT

Figure 1:
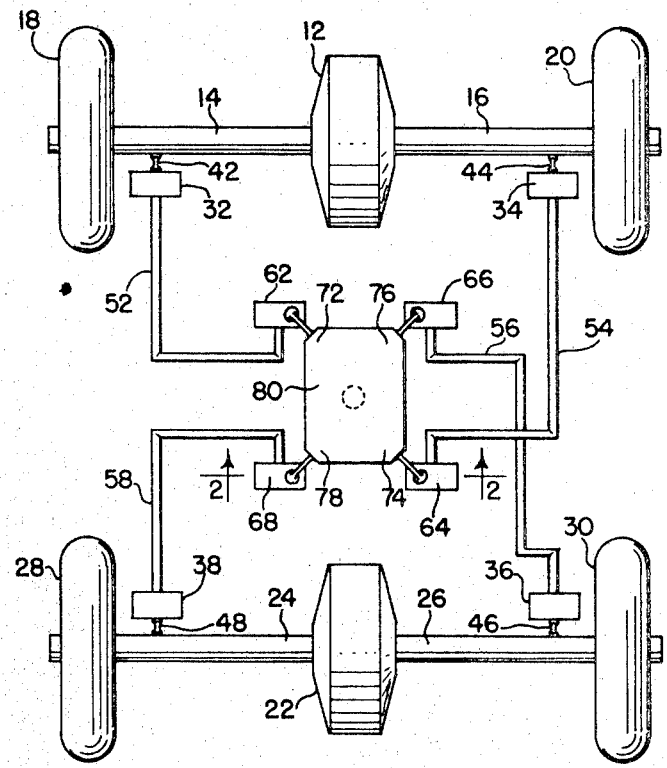
FIG. 1 is a schematic representation of a four wheel drive vehicle showing the connections between the brake control member and the brake cylinders for the individual wheels.

In FIG. 1 the invention is schematically represented in its operational environment relative to a four wheel drive vehicle indicated generally at 10. The vehicle includes a forward differential housing 12 and a pair of axle housings 14, 16 which house differential gears and axle members (not shown) which supply power to the wheels 18, 20. The vehicle also includes a rear differential housing 22, axle housings 24, 26 and wheels 28, 30 which are adapted to be driven in a manner similar to the front wheels 18, 20. Associated with each of the wheels 18, 20, 30 and 28 respectively are brake actuating wheel cylinders 32, 34, 36 and 38. Each of the wheel cylinders 32, 34, 36 and 38 includes respectively, a reciprocable member 42, 44, 46 and 48 which serves to actuate the brake (not shown) for the associated wheel. The respective actuating members 42, 44, 46 and 48 are actuated by pistons (not shown) which are moved in response to fluid pressure in the fluid lines 52, 54, 56 and 58 respectively. The fluid in the fluid lines is selectively moved toward the wheel cylinders by valves or master cylinders 62, 64, 66 and 68 which in turn are actuated by downward pressure on the quadrants or corners 72, 74, 76 or 78 of a control member or brake pedal 80.

Figure 2:
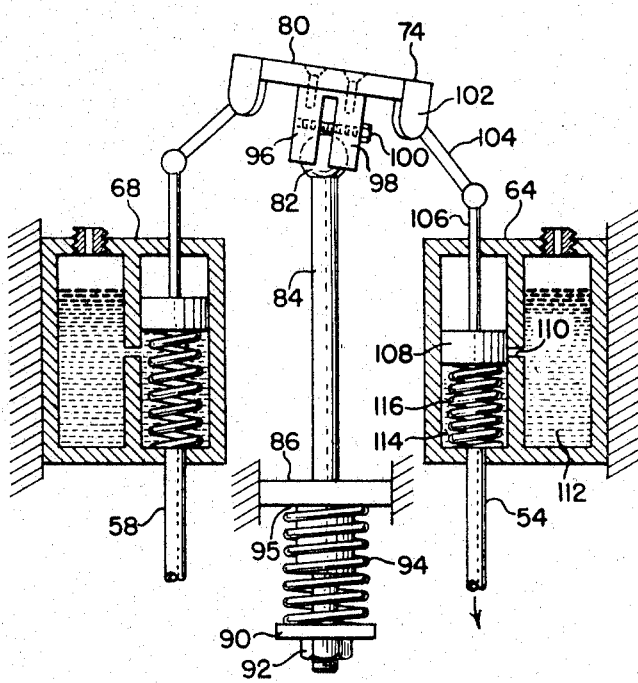
FIG. 2 is a view taken along lines 2—2 of FIG. 1.

FIG. 2 illustrates the manner in which the brake pedal 80 is mounted relative to its supports in the various valves or master cylinders 64, 68 which permit different modes of tilting movements applied to the brake pedal to cause the individual wheel brakes to be actuated in the various combinations previously described. The brake pedal plane 80 is pivotable about a ball shaped member 82 which is integral with a support shaft 84 mounted for vertical movement in a support member 86 fixed to the frame of the vehicle. At the end of shaft 84 opposite the ball 82 a plate 90 is mounted by means of a fastener such as bolt 92. A spring 94 is compressed between the plate 90 and the undersurface 95 of support bracket 86 in order to bias the shaft 84 and thus the brake pedal 80 downwardly. The brake pedal 80 is attached to the support ball 82 by means of a socket assembly comprising socket members 96, 98 on the underside of brake pedal 80. The socket members 96, 98 are held against the socket ball 82 by means of adjusting bolt 100. Although a ball and socket connection has been illustrated, it is obvious that other types of conventional universal or socket joints could be utilized.

When it is desired to actuate the brake pedal 80 such as by application of foot pressure to the right side sections or quadrants 74, 76 thereof to brake wheels 20 and 30, a bracket 102 integral with the underside of the pedal 80 will cause a link member 104 to depress the piston rod 106 and piston 108 in master cylinder 64 so as to cover the port 110 leading to reservoir 112 and cause the trapped fluid in chamber 114 to be moved through connecting line 54 to wheel cylinder 34 so as to apply the brakes to wheel 20. A spring 116 in the master cylinder 64 causes the piston to be normally biased in position above the port 110 so that the fluid within the chamber 114 will be vented to the atmosphere. Although not visible in FIG. 2, identical elements between pedal 80 and master-cylinder 66 would simultaneously apply the brakes to wheel 30. Since springs similar to spring 116 are present in each of the other cylinders 62, 66 and 68 the brake pedal 80 will be normally biased to a level position.

As will be appreciated from the foregoing description of a preferred embodiment of my invention, I have described a control device by which a vehicle operator can apply the brakes to the vehicle wheels selectively so as to immediately overcome the slipping of a wheel on either or both axles and thus increase the tractive effort supplied by the remaining wheels. Although I have shown this control device in the form of a foot operated brake pedal it should be appreciated that the control device could also comprise a hand operated member or a pair of side by side control members.

I claim:
1. In a wheel slip control system for four wheel drive vehicles having two pairs of wheels,
a pair of differential and axle assemblies for transmitting power to each of the pairs of wheels, and individual fluid operated brake means associated with each wheel, the improvement comprising:
a plurality of valve means for individually controlling the flow of fluid to each of said brake means, and a single manually operable control member mounted for universal pivotal movement, in accordance with the magnitude and direction of force applied thereto by an operator, to any one of a predetermined number of positions for actuating any individual valve, all of said valves, or any pair of valves controlling the brakes of wheels on different axles, whereby a slipping wheel may be braked and power transmitted through the differential connected to said slipping wheel.

2. The wheel slip control system of claim 1 wherein said single control member is a foot pedal which is selectively rockably pivotably movable in a forward, rearward, sideward, downward or diagonal direction.

3. The wheel slip control system of claim 2 wherein said foot pedal is attached at a central portion of its bottom surface by movably mounted ball joint means and at the four corner portions of its bottom surface to said valve means, said movable ball joint means being mounted so as to exert a resilient biasing force on said pedal tending to render all of said valve means inoperative except those attached to a portion of said pedal which is depressed by selective actuation of said pedal.

4. The wheel slip control system of claim 2 wherein said foot pedal is generally rectangular and has an upper foot engageable surface comprising four quadrants, each quadrant including a corner of said pedal, universal joint means for mounting said pedal to an upwardly biased support shaft, each of said valve means comprising a fluid cylinder and piston positioned adjacent each corner of said pedal and attached to the under side of said pedal by a movable linkage, a spring in each of said cylinders for biasing the linkage attached thereto toward said pedal, the pistons in each of said cylinders being adapted to be driven by downward pressure on the corner of said pedal to which said cylinder is attached to drive hydraulic fluid into a wheel cylinder connected to said cylinder for operating the brakes on the wheel with which said wheel cylinder is associated.

5. The wheel slip control system of claim 4 wherein the pistons and cylinders operated by pressure on the quadrants on one side of the pedal being connected to the non-corresponding remaining quadrants of the vehicle.

References Cited

UNITED STATES PATENTS

| | | | |
|---|---|---|---|
| 1,774,451 | 8/1930 | Norelius | 180—6.2 |
| 2,766,640 | 10/1956 | Ellsworth | 74—478 |
| 2,821,265 | 1/1958 | Morrison et al. | 74—478 X |
| 2,922,482 | 1/1960 | Fisher | 180—6.2 X |
| 2,989,875 | 6/1961 | Torrance | 74—478 |
| 3,367,435 | 7/1968 | Elg | 180—6.2 |

MILTON BUCHLER, Primary Examiner

JOHN J. McLAUGHLIN, Jr., Assistant Examiner

U.S. Cl. X.R.

74—478; 137—636; 180—6.2; 188—152; 251—295; 303—21